United States Patent
Goudy, Jr. et al.

[11] Patent Number: 5,520,810
[45] Date of Patent: May 28, 1996

[54] WATER FILTERING USING ZEBRA MUSSELS

[76] Inventors: Paul R. Goudy, Jr., 1231 Hermitage Rd., Bayside, Wis. 53217; Jerry L. Kaster, 33629 Contour Dr., Bohners Lake, Wis. 53105

[21] Appl. No.: 341,736

[22] Filed: Nov. 18, 1994

[51] Int. Cl.⁶ ........................................... C02F 3/32
[52] U.S. Cl. .................. 210/602; 210/150; 210/170; 119/234; 119/243
[58] Field of Search ........................ 210/602, 615, 210/617, 150, 151, 170, 747; 435/264, 262; 119/234, 243

[56] References Cited

U.S. PATENT DOCUMENTS

| | | | |
|---|---|---|---|
| 3,635,816 | 1/1972 | Golub | 210/602 |
| 5,174,897 | 12/1992 | Wengrzynek | 210/602 |
| 5,193,482 | 3/1993 | McLaughlin | 435/234 |

FOREIGN PATENT DOCUMENTS

| | | |
|---|---|---|
| 1011558 | 4/1983 | U.S.S.R. |
| 1224276 | 4/1986 | U.S.S.R. |
| 1229185 | 5/1986 | U.S.S.R. |
| 1643475 | 4/1991 | U.S.S.R. |

*Primary Examiner*—Christopher Upton
*Attorney, Agent, or Firm*—Quarles & Brady

[57] ABSTRACT

A method of treating water wherein the water is passed through a column of zebra mussels. In a preferred manner, a single bed of living zebra mussels is used.

5 Claims, 5 Drawing Sheets

WATER FILTERING USING ZEBRA MUSSELS

BACKGROUND OF THE INVENTION

This invention relates to the filtering of water. More particularly, it relates to the filtering of water with zebra mussel.

The zebra mussel, *Dreissena polymorpha*, is known as one of the most troublesome exotics to invade North America. Since its arrival in Lake St. Claire in 1985, it has spread throughout most watersheds east of the Mississippi River causing major biofouling of water users (utilities, industry, municipalities, waterway traffic). While millions of dollars have been spent to control the mussel, little progress has been made. This demonstration suggests that zebra mussels can be used beneficially to pretreat water for removal of microbial organisms and removal of finely suspended particles. The practicality of this hypothesis was based on the premise that zebra mussels have an extraordinary ability to filter large quantities of water (1-liter/day/individual) and either process it as feces (via gut transport) or pseudofeces (materials filtered, bound in mucus, and rejected from the shell). Thus, these mussels function to remove water borne constituents directly from the water.

Figure 1:
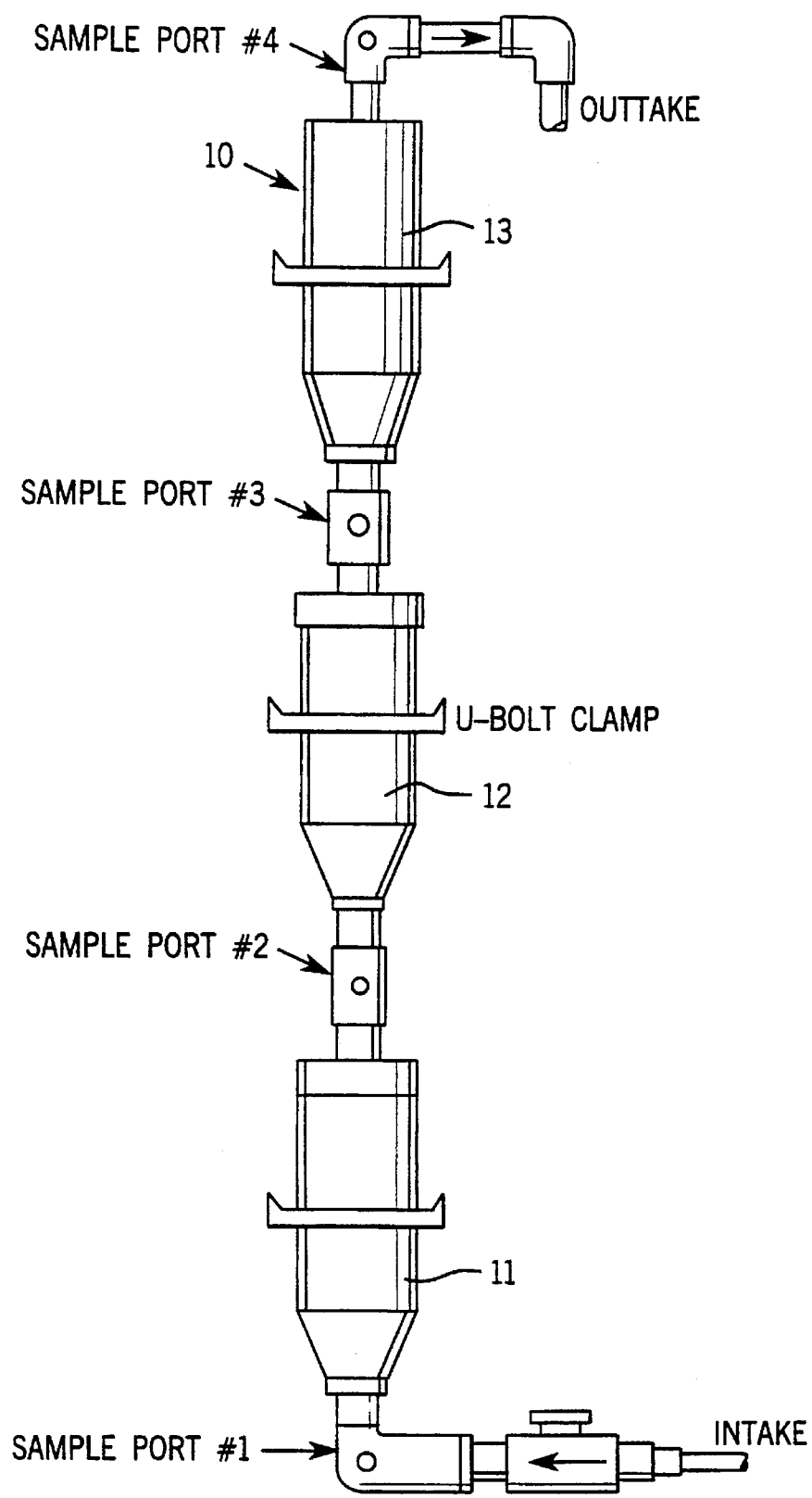
FIG. 1 is a diagrammatic view of a filtering chamber for use in the present method.

The filtering chamber 10 consisted of three compartments 11, 12 and 13 or "stages" linked in series, each housing 1000 g of zebra mussel (fresh weight) (FIG. 1.). Four sampling ports served to delineate changes as water passed through the system: Port 1 (Inlet), Port 2, Port 3 and Port 4 (Outlet). The Inlet served as the control sampling port by receiving water directly from the Milwaukee Harbor.

Prior to testing the zebra mussels were acclimated within the filter chamber for 72 hours. Flow rate through the zebra mussel filter bed was 1.8 liters/minute. Test metrics included: temperature, dissolved oxygen, total dissolve substances, pH, ammonia, suspended particles, post-treatment filtration rate, and bacterial analyses performed at the Linnwood Water Treatment Facility (City of Milwaukee) which included Clostridium Derfringens, Heterotrophic Plate Counts, and Coliform (special thanks is extended to Pat Klappa of the treatment facility for coordinating the bacterial testing).

Results

Figure 2:
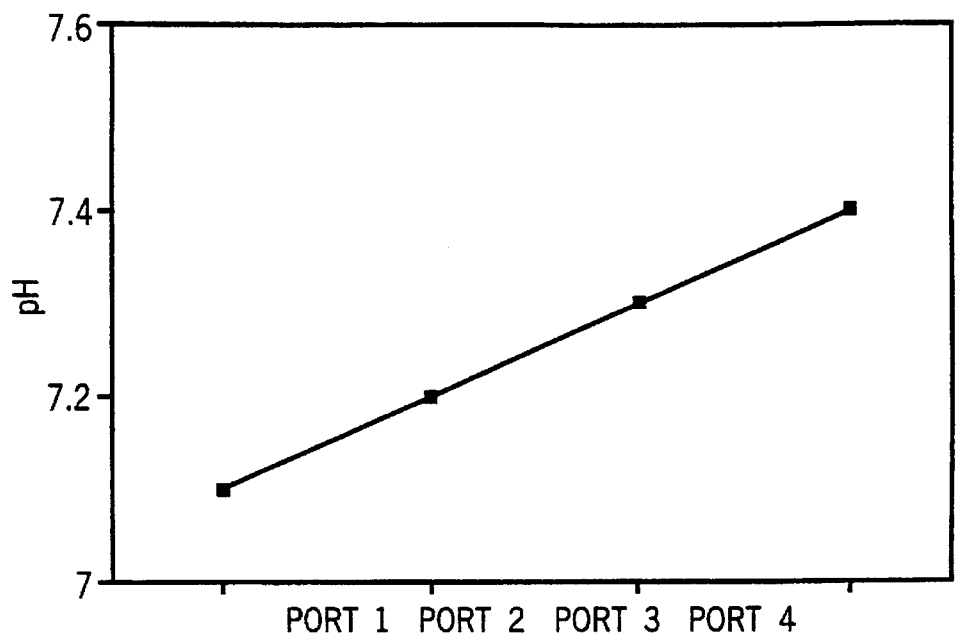
FIGS. 2–9 are graphs illustrating the test data.

Temperature: 19° C. Ports 1–4.

pH (FIG. 2): A small but consistent increase of pH occurred from 7.1, 7.2, 7.3, to 7.4 from Port 1 to Port 4, respectively.

Figure 3:
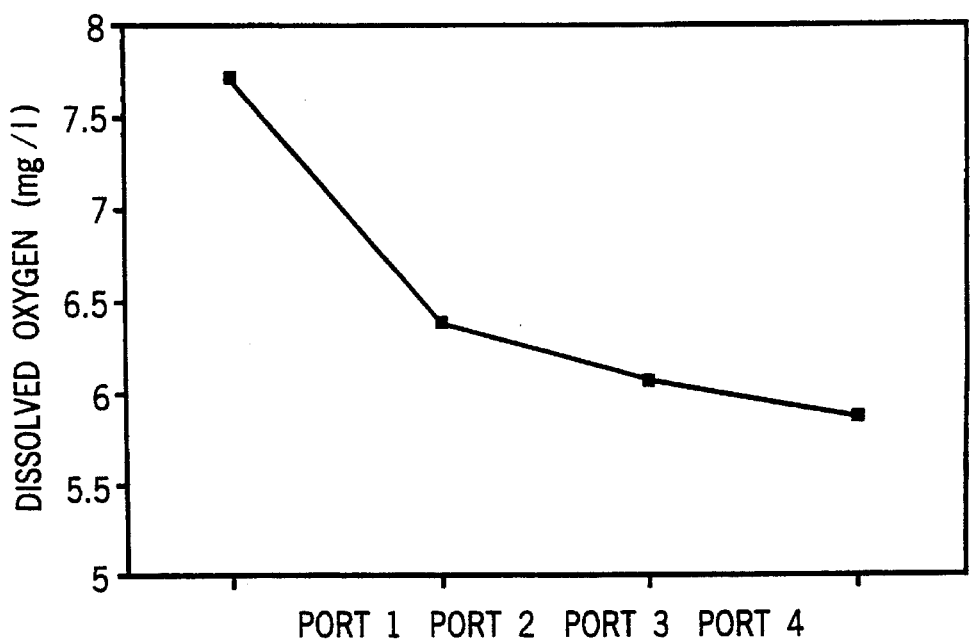

Dissolved Oxygen (FIG. 3): Oxygen dropped from 7.7, 6.4, 6.1, to 5.9 mg/1 from Port 1 to Port 4, respectively.

Figure 4:
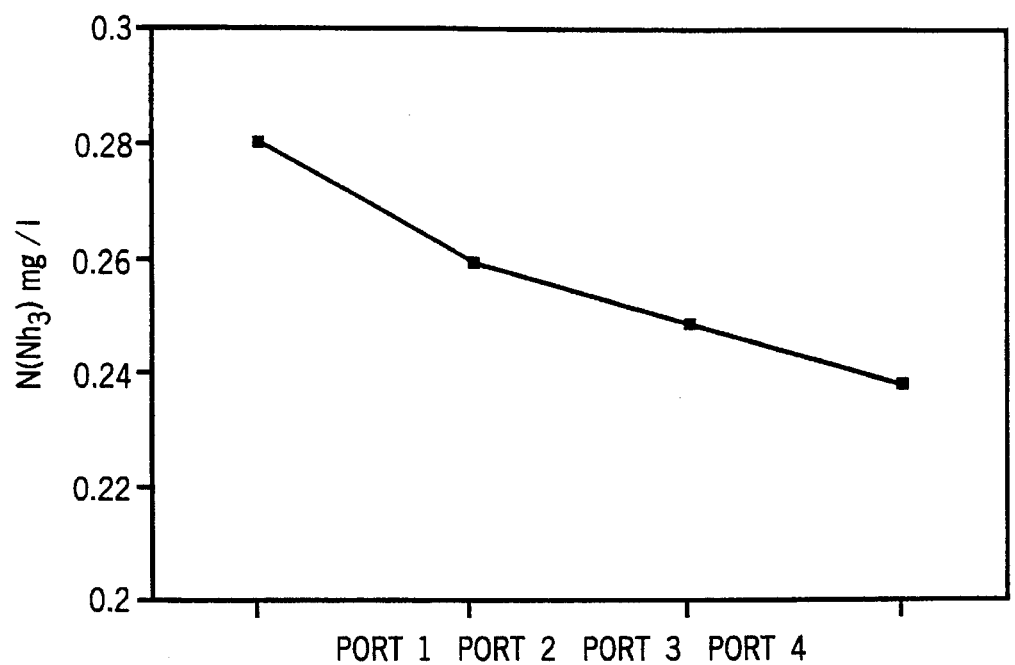

$N(Nh_3)$ (FIG. 4): Nitrogen ammonia fell from 0.28, 0.26, 0.25, to 0.24 mg/1 from Port 1 to Port 4, respectively.

Figure 5:
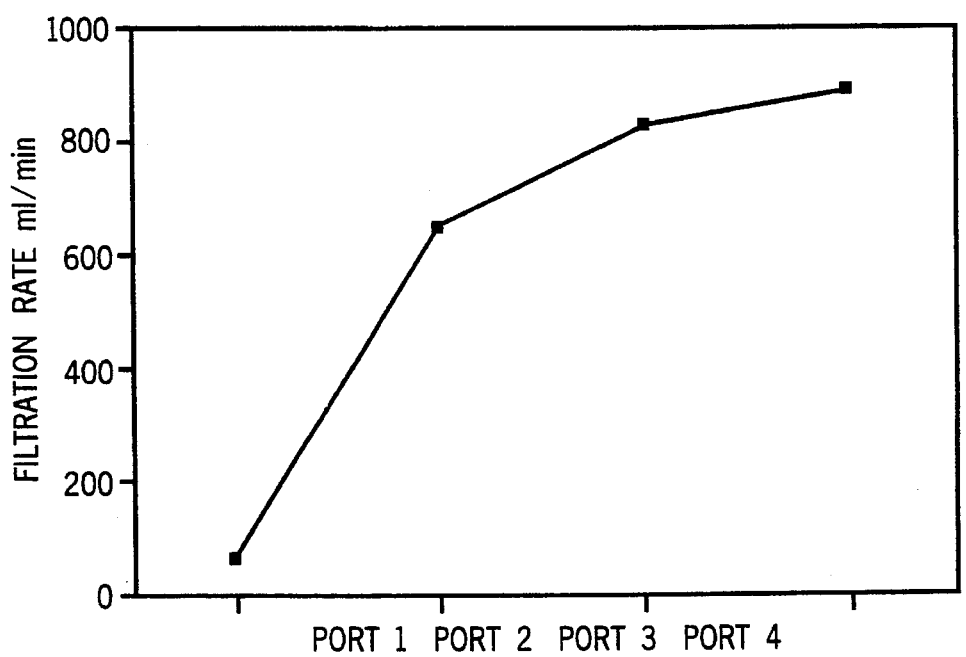

Filterability (FIG. 5): Trial 1—Port 1=10.1 ml/min; Port 4=734.7 ml/min. Trial 2—The filtration rate of samples drawn from Port 1, Port 2, Port 3, and Port 4 were 67.7, 654.5, 837.2, 900.0 ml/min from Ports 1 to Port 4, respectively. Both Trials 1 and 2 were conducted using a 47 mm, 0.8 μm pore filters.

Figure 6:
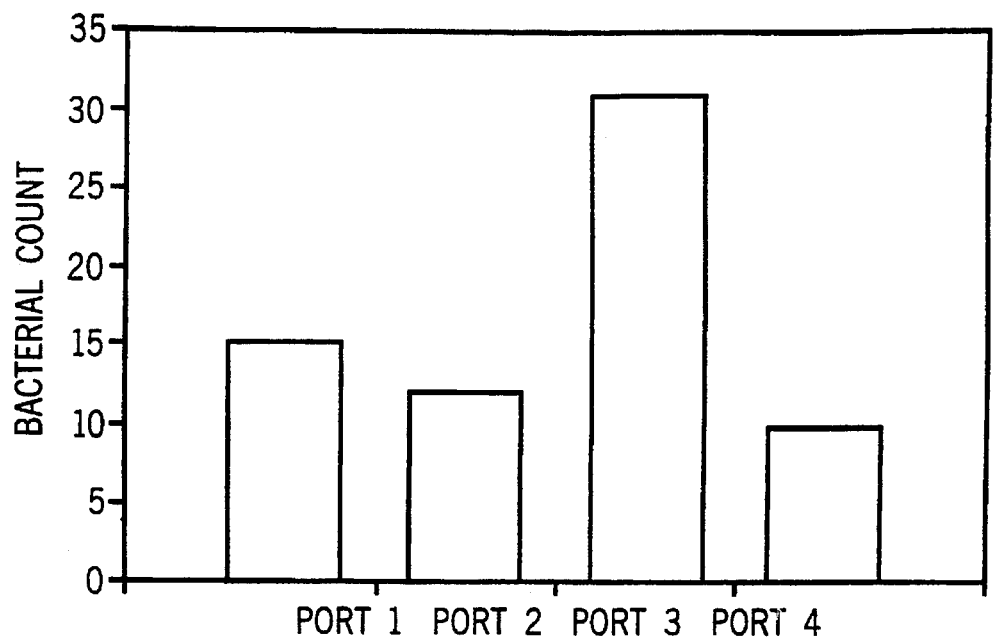
Figure 7:
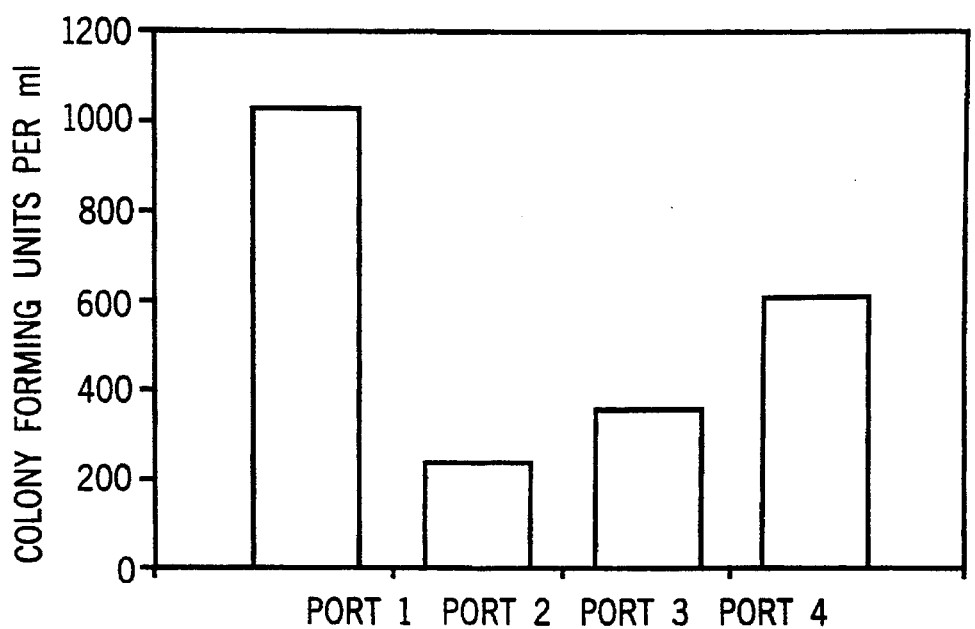
Figure 8:
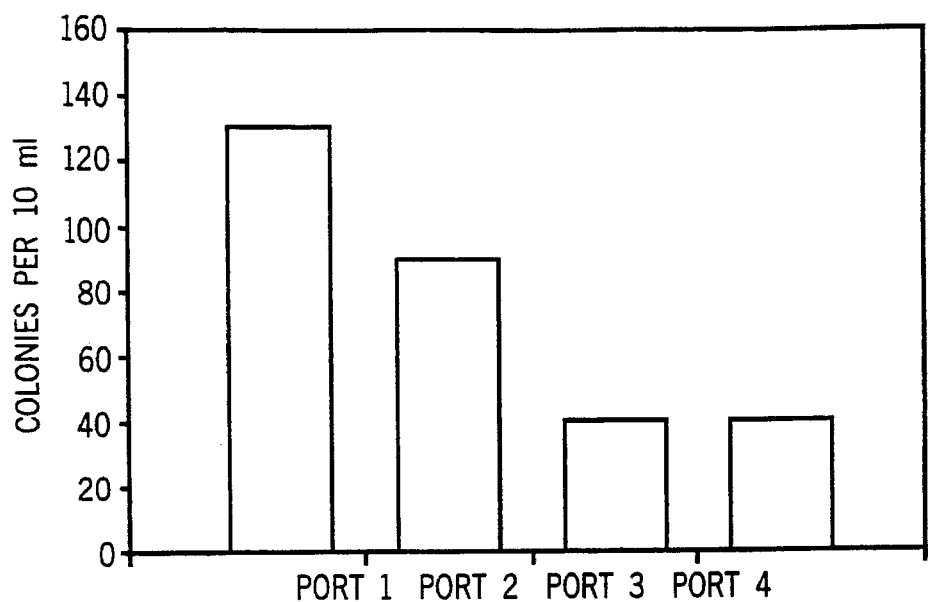
Figure 9:
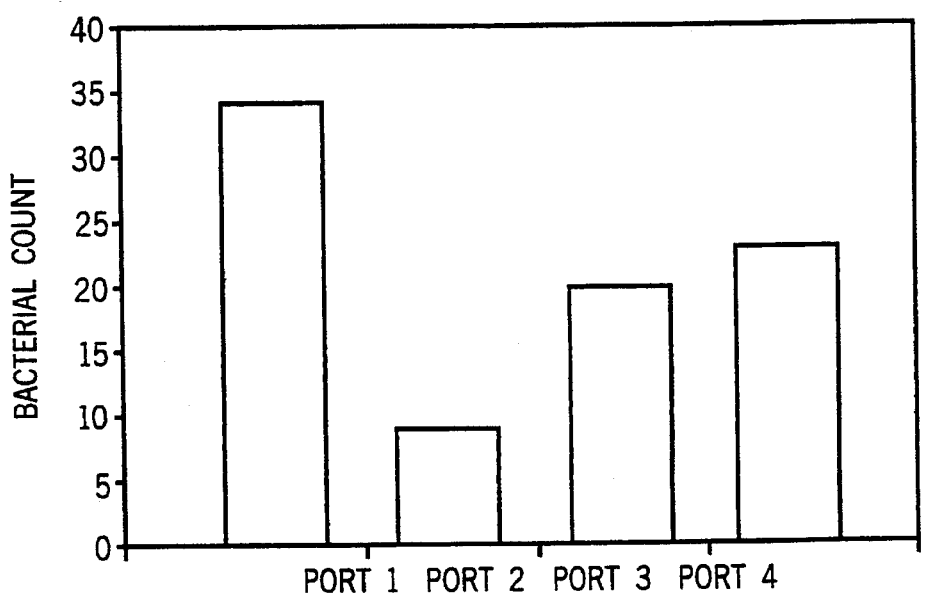

Clostridium perfringens Trial 1 (FIG. 6): Positive counts were 15, 12, 31, 10 from Ports 1 to Port 4, respectively. Trial 2 (FIG. 9): Colony counts were 34, 9, 20, 23 from Port 1 to Port 4, respectively.

Heterotrophic Plate Count Trial 1 (FIG. 7): Heterotrophic colonies were 1020, 230, 350, 600 from Ports 1 to 4, respectively. Trial 2 (FIG. 10): Counts were 1000, 270, 270, 500 from Port 1 to Port 4, respectively.

Coliform, Total and Fecal Trial 1 (no figure): All Coliform were greater than 23 (Trial 2 samples to be diluted). Trial 2 (FIG. 8): Total 130, 90, 40, 40 from Port 1 to Port 4, respectively. Fecal counts in all ports were 0.

The efficacy of using zebra mussels as a biofilter proved to be conceptually and empirically correct. While there are undoubtedly some complicated biological processes occurring in the biofilter, its practicality for water pretreatment has clearly been demonstrated in two areas of concern:

1) The biofilter biologically coagulated fine particulates, thereby substantially reducing filter clogging and increasing flow through the filter by a factor of at least 10 and as much as 72 times. The varying rate probably depends upon the condition of the inlet water (inner harbor) which fluctuates greatly with regard to turbidity.

2) The first stage of the biofilter substantially reduced heterotrophic colonies by greater than 75% (FIG. 7). *Clostridium perfringens*, an important indicator of fecal contamination was reduced by about 33% (FIG. 6) and 73% (Trial 2; FIG. 9). The Clostridium Trial 1 did have an unexpected and unexplainable increase, an "outlier" at Port 3. Trial 2 seem to follow the Heterotrophic Colony trend, i.e., the first stage of the filter is most reactive with regard to cropping bacteria. Total Coliform bacterial were reduced by 69%. The trend is that the biofilter considerably reduced bacterial density, especially with reference to the first stage. The effectiveness of the first stage suggests that the water flow through the biofilter could be increased so as to balance the system to obtain the peak result at the third stage.

It is important to stress that the water retention time in the biofilter was very low, 0.8 minutes per stage or 2.4 minutes for the entire filter. Thus, the time required for pretreatment was low which will facilitate scale up.

Some additional significant findings include:

Ammonia levels decreased as water moves through the system. This is believed to be due to bacterial nitrification that converts $NH_3$ to other, less toxic nitrogenous forms.

Oxygen consumption in the system was 0.75 mg/l/min. This indicated that zebra mussel density can be adjusted with the flow regime to regulate oxygen levels of the biofilter.

The total dissolved substances remained the same (390 μs) from Ports 1 to 4. This indicated that the biofilter targeted suspended particulate matter rather than the dissolved fraction.

Additional testing with Zebra Mussel Biofilter shows that it is also useful in conjunction with Cryptosporidium. Cryptosporidium sporozoites where inoculated into the Biofilter at a density of $6.8\times10^6$ which were reduced after 10 minutes to $3.4\times10^4$. This represents a 99.5% decrease of Cryptosporidium. This significant reduction was obtained under worse case conditions of high density of Cryptosporidium (≈225,000/liter of water passed through the Biofilter; retention time in filter was ≈3 minutes).

We claim:

1. A method of treating water comprising passing the water to be treated through an enclosed column of living zebra mussels.

2. A method of treating water comprising the steps of passing the water to be treated in succession through at least two enclosed beds of living zebra mussels.

3. A method of treating water comprising: passing the water to be treated through a first bed of living zebra mussels; and passing the effluent from the first bed through a second bed of living zebra mussels.

4. A method in accordance with claim 3 wherein the effluent from the second bed is passed through a third bed of living zebra mussels.

5. A water treatment apparatus comprising:
a water inlet;
a treated water outlet; and
a plurality of containers connected in series between the inlet and outlet, each container containing a bed of living zebra mussels.

* * * * *